United States Patent Office 2,855,379
Patented Oct. 7, 1958

2,855,379

COPOLYMERIZATES OF VINYL MONOMERS AND UNSATURATED POLYESTERS DERIVED FROM PHENYLOXY GLYCOLS

Carl Heinen, Wiesbaden, Germany, assignor to Chemische Werke Albert, Wiesbaden-Kastel (Amoneburg), Germany, a corporation of Germany No Drawing. Application January 31, 1956
Serial No. 562,580

Claims priority, application Germany
February 19, 1955

18 Claims. (Cl. 260—45.4)

The present invention relates to mixed or copolymerizates of unsaturated polyesters and monomers and their preparation.

Certain types of unsaturated polyester resin mixtures capable of polymerization are known and the term is used herein to designate mixtures of unsaturated polyester resins and monomers which serve as a solvent and a polymer-forming ingredient. Such mixtures are adapted to be hardened by chain polymerization of radicals to insoluble and infusible three dimensional cross-linked synthetic materials.

As is known, the reactivity of the polyester component depends on the kind and number of double bonds, which are built into the molecule by co-esterification of unsaturated starting materials, mostly α-, β-unsaturated polycarboxylic acids. Monomeric substances capable of mixed or copolymerization, in which the polyesters can be dissolved, are known in great numbers. In practice styrene is preferred, because it is unsaponifiable and imparts to the mixed polymerizates a chemical stability which is remarkable in the case of esters.

In the preparation of unsaturated polyester resins there are numerous possible combinations in selecting the starting materials, so that properties of the mixed polymerizates can be extensively adapted to the intended use. The processing of the resins is simple. For example, processing can take place after the addition of suitable agents for releasing polymerization in simple molds without the application of elevated temperatures and pressures. This constitutes a considerable progress in the manufacture of synthetic plastic materials, particularly in the production of structural parts having large surfaces. The outstanding mechanical and electrical characteristics of such reinforced mixed polymerizates makes possible a great number of other applications.

However, the unsaturated polyesters heretofore known have also certain disadvantages. For example, it has been known that polyesters prepared exclusively with unsaturated dicarboxylic acids and the simplest glycols do not show the degree of compatibility with conventional monomers or their polymerizates, which is necessary for obtaining a homogeneous mixed polymerizate. Furthermore, the solutions of such polyesters in monomers are reactive to such an extent that their mixed polymerization takes place with a strong evolution of heat and considerable shrinkage. The inner tensions and cracks resulting therefrom in the end product reduce the practical value of these masses, which have the general advantage of being highly resistant to chemical attack.

The foregoing defects can be eliminated, to a certain extent, by suitable modification of the polyesters. This is mostly effected by the introduction of saturated dicarboxylic acids. Up to the present, the modification of the characteristics of unsaturated polyesters, in the desired sense, by variation of the polyalcohol has been in little use. For example, by co-esterification of phthalic acid and saturated dicarboxylic acids a complete compatibility of the polyester can be attained with styrene, as well as of the mixed polymerizate with polystyrene, thereby clear and homogeneous masses are obtained. Simultaneously the reactivity of the unsaturated polyester mixture is reduced and shrinking during mixed polymerization is decreased. The disadvantage of this type of modification is believed due to the double bonds in the molecular chain being removed from each other, whereby the reactivity and capability of cross-linking are reduced, which is understandable. As a consequence of the reduced cross-linking of the mixed polymerizate resulting from this condition, its resistance to heat is lowered and the tendency to swell in organic solvents increases.

It has now been found that the above mentioned disadvantages can be substantially reduced or eliminated if in the preparation of mixed or copolymerizates of unsaturated polyesters of the following type are used. The unsaturated polyesters are prepared from: (1) unsaturated polycarboxylic acids, or their anhydrides or derivatives, preferably unsaturated aliphatic dicarboxylic acids or their anhydrides or derivatives, alone or in mixture with each other; or, if desired, with the addition of saturated polycarboxylic acids or their derivatives, preferably saturated aliphatic dicarboxylic acids, and (2) such glycols or their epoxide compounds or derivatives of these compounds, which are derived from compounds containing ethylene glycol or ethylene oxide groups by substituting at least one hydrogen atom of such compounds by one substituent in each case, said substituent containing at least one aromatic nucleous which can be hydrogenated completely or partially. The residual hydrogen atoms of the ethylene glycol or ethylene oxide, which are directly connected with carbon, can be partially substituted by alkyl or halogen radicals. These ethylene glycol or ethylene oxide compounds containing a substituent with an aromatic nucleous may be used alone or in mixture with each other; or, if desired, with the addition of other polyalcohols or their derivatives, preferably diols, the functional groups of which can be closed if desired in a known manner by conjoint use of monofunctional alcohols or monofunctional carboxylic acids.

In the preparation of the polyesters to be reacted according to the present invention, for example, mono-ethers of glycerol or glycide are used which contain in the compound, connected through the ether-oxygen, at least one aromatic nucleus which can be completely or partially hydrogenated. Such compounds can be obtained, for example, by the reaction of compounds having a phenolic hydroxyl group with glycerolmonochlorhydrin or with epichlorhydrin. It has been found to be particularly advantageous to use as glycols or as their epoxy derivatives phenyl-ethylene oxide-styrene oxide, tolyl ethylene oxide or other compounds containing a phenyl radical in a substituted or unsubstituted form and the like, or the glycols obtainable therefrom by hydrolysis.

The epoxides, when reacted according to the present invention, have the advantage over the corresponding glycols that one mol less of water has to be removed during esterification. It is true that in the case of certain highly reactive epoxide compounds the possibility that polymers thereof may be found, which is not always desirable, must be taken into consideration for such polymerization reactions may adversely affect the esterification reaction. However, by suitable steps, the relative speeds of these two types of reactions can be regulated in such a manner that the esterification reaction has the preference. Correspondingly any substituted polyethyleneglycols which may thereby be formed, are of course also esterified. However, they affect by no means the value of the polyester. All such glycols are referred to herein as alkylene glycols.

In addition to the special types of substituted diols and/or epoxy compounds, other glycols can be simultaneously used, for example, ethylene glycol, polymethylene glycols, polyethylene glycols, propylene glycol, polypropylene glycols, butylene glycol, and the like.

In the preparation of the polyesters hereof, unsaturated polycarboxylic acids or their anhydrides may be used. However, in accordance with an important embodiment of the invention, unsaturated aliphatic dicarboxylic acids, such as maleic acid, fumaric acid, itaconic acid, citraconic acid, or the corresponding anhydrides or derivatives of these aliphatic compounds are used by themselves or in mixture with one another.

If desired, in order to modify the effect of the novel polyesters of this invention, it is possible to incorporate saturated polycarboxylic acids, their anhydrides or derivatives as an acid reactant. Preferably, however, saturated dicarboxylic acids or their anhydrides such as adipic acid or sebacic acid are used; or even phthalic acid may be used; or the derivatives of the before mentioned compounds. Diene adducts of maleic acid with cyclopentadiene, hexachlorocyclopentadiene, and others may also be used.

The terminal groups of the polyesters to be ultimately treated with the reactive monomers according to this invention, can be extensively closed, if desired, by co-esterification with monofunctional compounds. It has been found that for this purpose saturated or unsaturated monocarboxylic acids or monoalcohols can be used. For example, benzoic acid and its homologues, natural and synthetic fatty acids, acrylic acid and its homologues, fatty alcohols, benzyl alcohols, allyl alcohols and the like, can be used. The presence of such mono-functional compounds facilitates, also, the conjoint use of polycarboxylic acids or polyalcohols having three or more functional groups.

The preparation of the ester can take place in known manner, for example, in a melt or in the presence of an organic solvent, whereby any water formed during the condensation can be removed by recycling azeotropic distillation. It may be of advantage to carry out esterification in an inert atmosphere. The use of reaction accelerators may be advantageous.

The unsaturated polycondensates hereof which have been esterified to the desired extent, are dissolved in a polymerizable monomer, preferably with the addition of a suitable inhibitor. Those compounds which contain a ring system of an aromatic nature, such as styrene, vinyl toluene, vinyl xylene and like vinyl benzene compounds, diallyl phthalate, triallyl cyanurate and like vinyl compounds are of primary importance. However, other polymerizable monomers such as vinyl acetate, acrylic acid esters, methacrylic acid esters, esters of the allyl alcohol, acrylonitrile and others can also be used. Thus, in accordance with another important feature of the invention, reactive monomers are used which contain a vinyl functional group. The use of mixtures of monomers is often of advantage.

The unsaturated polyester resin in admixture with the reactive monomer is polymerized in conventional manner with known catalysts, e. g. benzoyl peroxide, cumene hydroperoxide, methylethyl ketone peroxide, etc., frequently with the addition of accelerators such as cobalt naphthenate or tertiary aromatic amines. In this way, mixed or copolymerization starts with, or without, the application of heat, depending on the catalyst selected or the catalyst-accelerator-system.

After hardening the mixed or copolymerizates are three dimensionally cross-linked and are thus insoluble and infusible. By suitable selection of the starting materials subjected to polycondensation and of the polymerizable monomers and also by selection of the mixing ratio and the manner of carrying out hardening, the characteristics of the finished product can be extensively adjusted to the intended use.

The polyester resins produced, according to this invention, do not show the disadvantages exhibited by polyester resins prepared according to the known process, i. e. insufficient compatibility with the reactive monomer or its polymer, strong shrinking during condensation, low resistance to heat, insufficient stability to hydrolysis and a low resistance to swelling. It is particularly unexpected that even when using exclusively unsaturated dicarboxylic acids, in the process of this invention, highly reactive polyesters having a high proportion of double bonds can be obtained which do not have the above described disadvantages of the particularly reactive types of the prior art which endanger the practical value of their mixed polymerizates while their particular advantages such as hardness and chemical stability are retained.

The novel unsaturated polyesters used according to the present invention and prepared by taking into consideration the above mentioned viewpoints, can be further diluted in the course of their processing by the addition of suitable monomers, without the occurrence of incompatibility.

The polyesters prepared and used according to this invention exhibit numerous advantages in comparison with the known polyesters. For example, they can be shipped without difficulty when ground to grain size, since they do not require the use of particular precautions even when exposed to tropical temperatures. In their processing they can be stored for an unlimited period of time. Thus the operator can adapt the type and amount of the monomer, or monomer mixture, in which the granulated polyester dissolves readily to the intended use. However, these characteristics are of value regardless of whether the polyesters are to be used in the production of copolymers or are used per se as adhesives, coating materials, reinforced plastics or the like.

The shrinking of the new materials during mixed or copolymerization with the monomer is small, so that the formation of cracks and inner tensions during hardening is avoided. The hardened mixed polymerizates are transparent products of high mechanical strength and excellent stability to solvents, acids and alkalies, which is a particular advantage in their practical use, e. g. as molded articles, laminated materials provided with reinforcing glass fibers, lacquer films and the like. They are exceptionally well adapted for the manufacture of non-sticky molding masses and so-called "pre-impregnated" glass textiles.

The following examples will further illustrate the invention:

Example 1

Three hundred forty (340) g. glycerol-α-monophenyl-ether, derived from glycerol-α-monochlorhydrin and phenol, and 100 g. ethylene glycol are heated to 80° C. Three hundred fifty (350) g. maleic acid anhydride are added and the reaction mass is slowly heated up to 180° C., while stirring, in an inert gaseous atmosphere. After the acid number has been reduced to about 40, esterification is continued under slowly increased vacuum until the acid number is reduced below 30.

Five hundred (500) g. of this highly viscous resin are dissolved in 214 g. of monostyrene with the addition of an inhibitor. After the addition of 1% of benzoyl peroxide the product is poured into a suitable mold and is cured in conventional manner by heating. The cured castings show only slight shrinkage. They are clear as glass, somewhat yellowish and possess good mechanical strength characteristics. They are not attacked by boiling acetone after a long period of time.

Example 2

Four hundred fifty (450) g. tertiary butylphenylglycid-ether are drop-wise introduced, at about 120° C., into the solution of 196 g. maleic acid anhydride in 100 ml. xylene. Subsequently, in a nitrogen atmosphere and during constant stirring, the temperature is slowly increased so that water and xylene are distilled off. Esterification is continued to the desired extent under vacuum. The somewhat colored resin has a melting point of about 65° C. and dissolves readily in styrene or vinyl toluene. Such cast resins can be diluted to any desired extent with styrene, or they can be mixed with the resin obtained in Example 1, in any desired proportion, without the occurrence of incompatibility.

A 60% solution of the obtained polyester in styrene is mixed with 2% of cumene hydroperoxide and 0.08% cobalt naphthenate and cast into test tubes of 8 mm. width and 120 mm. length. After 1½ hours at room temperature the castings were cured to faultless products.

Example 3

Two hundred thirty-two (232) g. of fumaric acid, 202 g. sebacic acid and 588 g. of a distilled product prepared by the reaction of a technical cresol mixture with glycerolmonochlorhydrin are heated to 180° C. under constant stirring while carbon dioxide is passed therethrough. After the splitting off of water is completed, esterification is carried out at the same temperature for 8 hours under a vacuum which is gradually increased to 0.5 Torr. Further treatment of the viscous, bright-yellow resin is carried out in the manner described in Example 1. The castings are more flexible than those obtained according to the preceding examples.

Example 4

Ninety-eight (98) g. of maleic acid anhydride, 146 g. of adipic acid and 276 g. of phenylethyleneglycol prepared from styrene oxide, are stirred in an atmosphere of carbon dioxide and heated so slowly that splitting off of water takes place mostly at 140-170° C. Subsequently, esterification is continued for 5-8 hours under a vacuum of 300-80 Torr. at 170° C. Sixty (60) g. of ethylene glycol monophenylether prepared by the reaction of phenol with ethylene oxide, are now added and heating is continued under atmospheric pressure at 160-180° C. for an additional 4 hours. Connection with the vacuum pump is now established again and stirring at 180° C. is continued for 6 hours, whereby the vacuum is slowly increased up to 2 Torr. After cooling the polyester is converted into a 70% styrene solution. Hardening of the castings takes place as in Examples 1 and 2.

Example 5

Within a period of 6 hours, 225 g. of p-tertiary butylphenyl-glycidether are added dropwise to 105 g. of maleic acid anhydride dissolved in 150 ml. of xylene in a carbon dioxide atmosphere while stirring and at a temperature of 130-140° C. The temperature is then slowly increased so that xylene is distilled off. Starting material, which has been distilled over simultaneously with xylene, is determined and corresponding amounts are added to the reaction mixture. As soon as the temperature has reached 180° C., this temperature is maintained for several additional hours and finally the vacuum is increased to 12 Torr. The resin obtained in this manner with a melting point of 77° C. has an acid number of about 20 and an about equal hydroxyl number. The brittle resin dissolves easily after comminution in styrene.

Example 6

A mixture of 65 g. maleic acid anhydride, 65 g. of sebacic acid and 150 ml. of xylene is heated to 140° C. while passing therethrough carbon dioxide during constant stirring. Within 2 hours 165 g. of cresylglycidether are dropwise added, whereby the temperature of the reaction mixture is increased to 160° C. The further procedure corresponds to that described in Example 5. The resulting product is a viscous, soft resin which is compatible with styrene to any desired extent. The characteristics of castings prepared from the latter in a conventional manner hardly differ from those of Example 3.

Example 7

One hundred sixty-five (165) g. of cresylglycidether are added dropwise and stirred into a mixture of 65 g. maleic acid anhydride, 50 g. adipic acid and 150 ml. of xylene while passing nitrogen therethrough, as described in the preceding examples. The reaction is completed under the conditions described in Example 5. A viscous soft resin is obtained which is compatible with vinyl toluene to any desired extent. Its 70% solution in vinyl toluene is hardened, according to Example 1, to castings which have a high bending strength.

Example 8

One hundred forty (140) g. of cresylglycidether are added at 130-150° C. within 4 hours and stirred into a mixture of 65 g. maleic acid anhydride, 65 g. of sebacic acid, 17 g. of diethylene glycol and 150 ml. of xylene. Subsequently, within 14 hours, xylene and water are distilled off at 150° C. likewise under stirring. The reaction mixture remains clear in the cold and forms a clear solution in styrene. The reaction is completed by heating under vacuum for 6 hours, whereby the temperature is increased to 180° C.

Example 9

Two hundred seventy-eight (278) g. of freshly distilled tertiary butylphenylglycidether are added dropwise in an atmosphere of carbon dioxide, under stirring and within 6 hours, to a mixture of 98 g. maleic acid anhydride, 73 g. adipic acid, 43 g. of crotonic acid, 19 g. of propanediol-1,2, 20 g. of hexanetriol, and 200 ml. of xylene. The temperature is then maintained at 145-155° C. for 20 hours, so that xylene and water distill off quite slowly. After increasing the temperature to 180° C., the missing portion of acid is replaced and the temperature is maintained for 1-2 hours at this level with the ultimate application of a vacuum. After cooling the reaction mass, a known inhibitor is added to the mixture and a 70% solution is prepared with styrene.

Example 10

Three hundred sixty (360) g. of tertiary butylphenylglycid ether are added dropwise to a mixture consisting of 196 g. of maleic acid anhydride, 101 g. of sebacic acid, 23 g. of butanediol-1,3 and 200 ml. of trichloroethylene, brought to boiling on the water separator while the mixture is constantly stirred and nitrogen is passed therethrough. After completing this addition, boiling is continued for 15 hours, whereupon 0.1% of p-toluene sulfonic acid and an amount of maleic acid anhydride, which is equivalent to the maleic acid distilled off, are added. After boiling for 10 hours and replacement of the escaped maleic acid, 50 ml. of allyl alcohol are added and azeotropic esterification is continued. As soon as splitting off water considerably subsides, 50 ml. of allyl alcohol are added again and esterification is continued until the separation of water substantially ceases. After neutralization of the esterification catalyst, the reaction mixture is boiled for 2-4 hours and the reaction mixture is filtered. After distilling off volatile ingredients, under vacuum, a clear viscous resin is obtained.

In producing the polyesters of this invention such molar proportions may be used as those used in the producing known kindred polyesters. For example, when reacting dibasic acids and diols approximately molar ratios are used or a slight excess of the diol may be used to facilitate condensation. It will be understood, however, that molar ratios are varied in a known manner when monofunctional modifying compounds are used as condensation agents or reactants such as the monofunctional acids or monofunctional alcohols discussed above. Also, the factors influencing or determining the amount of polymerizable monomer used to produce the crosslinked three dimensional, insoluble, and infusible resins hereof are the same as those heretofore influencing the choice of amounts of monomers used in the production of modified polyester resins such as the nature of the unsaturated polybasic acid used in the production of the polyester, the presence or absence of saturated polybasic acid, the kind and number of unsaturated groups in the polyester, the characteristics desired in the final resin product, and the like. Generally speaking, the amount of the polymerizable monomer used is less than the amount of polyester used but is sufficient to impart the desired physical and chemical characteristics to the resin ultimately produced. For example, the amount of monomer usually varies from one part to a quarter calculated on one part of the unsaturated polyester.

The term "polyester" is used herein to cover polymeric products formed by the interaction of polyhydric alcohols with polybasic acids or chemically equivalent reactions. It will be understood, therefore, that specifying a reaction of a particular polyhydric alcohol or particular class of polyhydric alcohol with a particular polybasic acid or particular class of polybasic acid is inclusive of the chemically equivalent reaction of the respective epoxy compounds and acid anhydrides. For example, it is well known that substantially chemically equivalent linear polyesters can be obtained from the reaction of dibasic carboxylic acids or their anhydrides with dihydric alcohols or their epoxy derivatives, i. e. their epoxides.

It should be understood that this invention is not limited to the specific illustrative details of the disclosure herein set out but that it extends to all equivalents which will occur to those skilled in the art upon consideration of the scope of the claims appended hereto which are designed to define the invention.

I claim:

1. In the production of copolymers of reactive unsaturated monomers and unsaturated polyesters derived by interaction of unsaturated polybasic acids and polyhydric alcohols, the improvement comprising deriving the unsaturated polyester by the esterification of maleic acid with a propylene glycol having a phenyloxy substituent on a carbon atom thereof, and then copolymerizing the formed polyester with a polymerizable vinyl monomer.

2. A process for the production of a modified polyester resin comprising forming a polyester by the esterification of maleic acid with a phenol-glycidol mono ether and copolymerizing the formed unsaturated polyester with a vinyl benzene.

3. An insoluble and infusible copolymer of a vinyl benzene with an unsaturated polyester resin formed by the esterification of 1,2-dicarboxy ethene with a phenyloxy propylene glycol.

4. An insoluble and infusible copolymer of a vinyl benzene with an unsaturated polyester resin formed by the esterification of maleic acid with an alkylphenyl ether of glycerol.

5. An insoluble and infusible copolymer of styrene with an unsaturated polyester resin formed by the esterification of maleic anhydride with α-phenyl ether of glycerol.

6. An insoluble and infusible copolymer of vinyl toluene with an unsaturated polyester resin formed by the esterification of maleic anhydride with cresyl ether of glycerol.

7. An insoluble and infusible copolymer of allyl alcohol with an unsaturated polyester resin formed by the esterification of maleic anhydride with butylphenyl ether of glycerol.

8. An insoluble and infusible copolymer of styrene with an unsaturated polyester resin formed by the esterification of fumaric acid with cresyl ether of glycerol.

9. A resin obtained by the esterification of maleic acid with a phenyloxy-propylene glycol.

10. A process for the production of copolymers from (a) unsaturated polyesters of the type derived from alkylene glycol and unsaturated aliphatic dicarboxylic acid and from (b) polymerizable monomeric vinyl compounds, which comprises forming a resinous esterification product of a 1,2-dicarboxy ethene with an ether of the formula RO—X, wherein RO is the ether forming radical of a monovalent phenol and X is an ether forming radical of a compound selected from the group consisting of glycerol and glycidol, and copolymerizing said resinous product with a polymerizable vinyl monomer in the presence of a polymerization catalyst.

11. A process for the production of copolymers from (a) unsaturated polyesters of the type derived from alkylene glycol and unsaturated aliphatic dicarboxylic acid and from (b) polymerizable monomeric vinyl compounds, which comprises forming a resinous esterification product of a 1,2-dicarboxy ethene with a mixture of an aliphatic polyvalent alcohol and an ether of the formula RO—X, wherein RO is the ether forming radical of a monovalent phenol and X is an ether forming radical of a compound selected from the group consisting of glycerol and glycidol and copolymerizing said resinous product with a polymerizable vinyl monomer in the present of a polymerization catalyst.

12. A resinous esterification product of a 1,2-dicarboxy ethene with an ether of the formula RO—X, wherein RO is the ether forming radical of a monovalent phenol and X is an ether forming radical of a compound selected from the group consisting of glycerol and glycidol.

13. A resinous esterification product of a 1,2-dicarboxy ethene with a mixture of an aliphatic polyvalent alcohol and an ether of the formula RO—X, wherein RO is the ether forming radical of a monovalent phenol and X is an ether forming radical of a compound selected from the group consisting of glycerol and glycidol.

14. A resinous copolymer of (1) a resinous esterification product of a 1,2-dicarboxy ethene with an ether of the formula RO—X, wherein RO is the ether forming radical of a monovalent phenol and X an ether forming radical of a compound selected from the group consisting of glycerol and glycidol with (2) a polymerizable vinyl monomer.

15. A resinous copolymer of (1) a resinous esterification product of a 1,2-dicarboxy ethene with a mixture of an aliphatic polyvalent alcohol and an ether of the formula RO—X, wherein RO is the ether forming radical of a monovalent phenol and X is an ether forming radical of a compound selected from the group consisting of glycerol and glycidol with (2) a polymerizable vinyl monomer.

16. A resinous esterification product of maleic acid with an ether of the formula RO—X, wherein RO is the ether forming radical of a monovalent phenol and X is an ether forming radical of a compound selected from the group consisting of glycerol and glycidol.

17. A resinous copolymer of (1) a resinous esterification product of maleic acid with an ether of the formula RO—X, wherein RO is the ether forming radical of a monovalent phenol and X is an ether forming radical of a compound selected from the group consisting of glycerol and glycidol with (2) a polymerizable vinyl monomer.

18. A resinous copolymer of (1) a resinous esterification product of maleic acid with an alkylphenolglycidol ether with (2) a polymerizable vinyl monomer.

References Cited in the file of this patent

UNITED STATES PATENTS

| | | |
|---|---|---|
| 2,607,761 | Seymour | Aug. 19, 1952 |
| 2,662,070 | Kass et al. | Dec. 8, 1953 |